3,228,973
PROCESS OF REMOVING POLYACRYLATES FROM CORRESPONDING MONOACRYLATES WITH AMORPHOUS CARBON ABSORBENTS
Patrick Joseph O'Connor, Pampa, Tex., assignor to Celanese Corporation of America, New York, N.Y., a corporation of Delaware
No Drawing. Filed Feb. 7, 1961, Ser. No. 87,524
12 Claims. (Cl. 260—486)

This invention relates to the production of acrylate monomers and more particularly to the removal of polymers from acrylate monomer compositions.

The production of arcylate monomer compositions is often hampered by the polymerization of such monomers to form polymers which are soluble in the monomer compositions. These soluble polymers adversely affect the quality of the monomer compositions. For example, such polymers have undesirable effects on the products of any subsequent polymerization of the monomer compositions. Further, in acrylate monomer compositions which have been stored for periods of time, undesirable polymerization resulting in soluble polymers also occurs.

The removal of such soluble polymers from monomer composition has been found to be very difficult. For example, attempts at removal of such polymers by distillation have been hampered by the formation of additional polymers during distillation.

It is the primary object of this invention to provide a novel process for the removal of polymers from acrylate monomer compositions.

Other objects and advantages of this invention will become evident from the specification and claims which follow in which all proportions are by weight unless otherwise stated.

In accordance with one aspect of this invention, the monomer composition containing the soluble polymers is brought into contact with amorphous carbon particularly charcoal or carbon black which remove such polymer material by adsorption.

The monomer composition containing polymers may be brought into contact with the amorphous carbon to effect in any conventional manner such as passing the composition through a bed of the carbon or admixing the composition with finely divided amorphous carbon to form a slurry and then filtering to remove the carbon.

The amorphous carbon is preferably carbon black, charcoal or mixtures of both. Carbon black marketed by Cabot Carbon Company as "Black Pearls 85" has been found to be very effective in the process of this invention as has "Darco S–51," a mixture of carbon black and activated charcoal marketed by the Atlas Powder Company. Other forms of amorphous carbon such as boneblack will give satisfactory results.

It has been found, particularly when the monomer composition is admixed with the amorphous carbon to form a slurry, that the more finely divided the carbon is, the more effective will be the removal of polymer.

The polymer content of the monomer composition may be determined by admixing 1 volume of the composition with 10 volumes of methanol at 25° C. and comparing the turbidity of the mixture with the turbidity of 11 volumes of pure methanol at 25° C. in a vessel similar to that in which the mixture is retained. The acrylate monomers are soluble in the methanol in the above proportions while the polymer is not soluble and causes visible turbidity when undesirable amounts of polymer are present. Monomer compositions which display distinct turbidity in methanol will show distinct diminution of turbidity after being treated according to the process of this invention.

The acrylate monomer composition is preferably maintained in contact with the charcoal for a period sufficient to give a turbidity test result which is as clear as that of the pure methanol. Accordingly, when the composition is admixed with finely divided carbon black to form a slurry, it is peferably permitted to remain in contact with the carbon black for from ½ to 1 hour under continuous agitation at a temperature preferably from about 15 to 30° C. before filtering to remove the carbon black. Charcoal may be used instead of carbon black under the same conditions. In forming a slurry as described, it is preferable that the amorphous carbon comprise from 0.3% to 1.5% of the total mixture.

The process of this invention has been found to be particularly effective in the production of esters of acrylic and lower alkacrylic acids, e.g. methacrylic acid, particularly alkyl esters of acrylic acid such as 2-ethylhexyl acrylate. As used in this specification and claims, the term acrylate monomers is meant to include monomers of both acrylic and lower alkacrylic acid.

Other monomers such as butyl acrylate, ethyl acrylate, methyl acrylate and methyl methacrylate may be processed in accordance with this invention.

The following examples will serve to better illustrate the practice of this invention.

*Example I*

A 2-ethylhexyl acrylate monomer composition is tested for the presence of polymerized 2-ethylhexyl acrylate by thoroughly mixing 10 ml. of the composition with 100 ml. of methanol in a Nessler tube and then comparing the turbidity of the mixture with 110 ml. of pure methanol in a similar tube. The mixture containing the 2-ethylhexyl acrylate composition displays substantially greater turbidity than the pure methanol indicating the presence of a considerable amount of polymer. 99.3 parts of the original composition are then mixed with 0.7 part of finely divided carbon black having the following specification: pore density of 23 lbs. per cubic foot; grit or residue on a 325 mesh screen 0.1% maximum; surface area 265 square meters per gram calculated by nitrogen adsorption; a reading of 77 on nigrometer scale; percent moisture 3–5%; organic ash .05% maximum and 4% volatile matter at 1750° F. The mixture is maintained as a slurry for ¾ hour at 25° C. by continuous agitation. The carbon black is then removed by filtration and 10 ml. of the remaining treated composition are mixed with 100 ml. of methanol and again compared for turbidity in the manner described above. The turbidity of the mixture is about the same as the turbidity of the methanol which is substantially nil. This indicates the substantial absence of polymer in deleterious quantities.

*Example II*

Example I is repeated under the same conditions except that 1 part of activated charcoal is mixed with 99 parts of the 2-ethylhexyl acrylate monomer composition. The same results are obtained as in Example I.

It is to be understood that the foregoing detailed description is given merely by way of illustration and that many variations may be made therein without departing from the spirit of my invention.

Having described my invention what I desire to secure by Letters Patent is:

1. A process for purifying acrylate monomers by separating acrylate polymers from a composition comprising acrylate monomers and acrylate polymers which process comprises contacting said composition with amorphous carbon.

2. The process set forth in claim 1, wherein said amorphous carbon is carbon black.

3. The process set forth in claim 1, wherein said amorphous carbon is charcoal.

4. A process according to claim 1, wherein said composition is passed through a bed of amorphous carbon.

5. A process according to claim 1, wherein finely divided amorphous carbon is admixed with the composition and then the mixture is filtered to remove the amorphous carbon.

6. The process set forth in claim 5, wherein said amorphous carbon comprises carbon black.

7. The process set forth in claim 5, wherein said amorphous carbon comprises charcoal.

8. The process defined in claim 1, wherein the composition is maintained in contact with the carbon until a sample of the resulting product when mixed with 10 times its volume of methanol exhibits no greater turbidity than an equal volume of methanol alone.

9. The process defined in claim 1, wherein said acrylate is 2-ethylhexyl acrylate.

10. The process purifying acrylate monomers by removal of acrylate polymers from solution in said monomers which process comprises contacting a solution of acrylate polymer in acrylate monomer with amorphous carbon whereby said polymer is removed from said monomer.

11. The process claimed in claim 10 wherein said acrylate is selected from the group consisting of 2-ethylhexyl-acrylate, butyl acrylate, methyl acrylate and methyl methacrylate.

12. The process claimed in claim 10 wherein said acrylate is 2-ethylhexyl acrylate.

References Cited by the Examiner

UNITED STATES PATENTS

| | | | |
|---|---|---|---|
| 2,618,652 | 11/1952 | Hollyday | 260—486 |
| 2,704,770 | 3/1955 | Anspon | 260—486 |
| 2,836,615 | 5/1958 | Heininger et al. | 260—486 |

OTHER REFERENCES

Jenckel et al.: Chem. Abs., 46, 4882h (1952).

JOSEPH L. SCHOFER, Primary Examiner.

HAROLD N. BURSTEIN, JOSEPH R. LIBERMAN, LEON J. BERCOVITZ, Examiners.

H. WONG, Assistant Examiner.